United States Patent
Majerus et al.

(10) Patent No.: US 11,139,256 B2
(45) Date of Patent: Oct. 5, 2021

(54) TAMPER-RESISTANT INTEGRATED CIRCUITS, AND RELATED METHODS

(71) Applicant: Micron Technology, Inc., Boise, ID (US)

(72) Inventors: Diana C. Majerus, Bosie, ID (US); Scott D. Van De Graaff, Boise, ID (US); Matthew N. Rocklein, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/547,289

(22) Filed: Aug. 21, 2019

(65) Prior Publication Data

US 2021/0057357 A1    Feb. 25, 2021

(51) Int. Cl.
*H01L 23/00* (2006.01)

(52) U.S. Cl.
CPC ................... *H01L 23/576* (2013.01)

(58) Field of Classification Search
CPC ......... H01L 23/576; H01L 2012/40255; H03F 2200/00; H01R 13/6683; H05K 2201/10151
See application file for complete search history.

(56) References Cited

U.S. PATENT DOCUMENTS

| | | | |
|---|---|---|---|
| 4,151,503 A * | 4/1979 | Cermak | H01C 7/045 204/408 |
| 4,510,036 A * | 4/1985 | Takeuchi | G01N 27/4065 204/408 |
| 5,018,102 A | 5/1991 | Houston | |
| 5,319,255 A | 6/1994 | Garverick et al. | |
| 5,389,218 A * | 2/1995 | Bonne | G01N 27/4067 204/408 |
| 5,389,738 A | 2/1995 | Piosenka et al. | |
| 5,861,652 A | 1/1999 | Cole et al. | |
| 6,885,604 B1 | 4/2005 | Lee et al. | |
| 6,885,605 B2 | 4/2005 | Lee et al. | |
| 7,005,733 B2 | 2/2006 | Kommerling et al. | |
| 7,122,899 B2 | 10/2006 | Lippmann et al. | |

(Continued)

OTHER PUBLICATIONS

Quadir et al., A Survey on Chip to System Reverse Engineering, ACM Journal on Emerging Technologies in Computing Systems, vol. 13, No. 1, Article 6, (Apr. 2016), 24 pages.

(Continued)

*Primary Examiner* — Zandra V Smith
*Assistant Examiner* — Andre C Stevenson
(74) *Attorney, Agent, or Firm* — TraskBritt (57) ABSTRACT

Systems, apparatus, and methods related to tamper-resistant integrated circuits are described. The tamper-resistant integrated circuits include tamper-resistant features including a tamper-resistant material formulated or configured to exhibit a change in at least one electrical property responsive to exposure to oxygen, electromagnetic radiation, or other environmental conditions. Data located within the integrated circuit may be erased, or at least a portion of the integrated circuit may be destroyed, responsive to a change in the at least one electrical property. In some examples, one or more electrical properties of a tamper-resistant feature may be measured. A change in an electrical property may be an indication that the associated integrated circuit has been tampered with.

27 Claims, 5 Drawing Sheets

(56) References Cited

U.S. PATENT DOCUMENTS

| | | | |
|---|---|---|---|
| 8,143,705 | B2 | 3/2012 | Van Geloven et al. |
| 8,315,107 | B2 | 11/2012 | Thiruvengadam et al. |
| 8,488,360 | B2 | 7/2013 | Okuda |
| 8,957,694 | B2 | 2/2015 | Hu et al. |
| 9,479,151 | B2 | 10/2016 | Gomm et al. |
| 9,947,609 | B2 | 4/2018 | Tucker et al. |
| 10,050,167 | B2 | 8/2018 | Cao et al. |
| 10,141,274 | B2 | 11/2018 | Cooney, III et al. |
| 2002/0199111 | A1 | 12/2002 | Clark et al. |
| 2006/0061819 | A1* | 3/2006 | Fujiwara ............ H04N 1/00244 358/1.15 |
| 2009/0040044 | A1* | 2/2009 | Chiao .................... G08B 25/10 340/540 |
| 2010/0076368 | A1* | 3/2010 | McNichols ............ A61N 1/325 604/20 |
| 2017/0038826 | A1* | 2/2017 | Nishijima ............. G06F 1/3287 |
| 2017/0124453 | A1 | 5/2017 | Noyes et al. |

OTHER PUBLICATIONS

Torrence et al., The State-of-the-Art in IC Reverse Engineering, Chipworks, Inc., Cryptographic Hardware and Embedded Systems—CHES 2009: 11th International Workshop Lausanne, Switzerland, (Sep. 6-9, 2009) Proceedings, pp. 363-381.

* cited by examiner

TAMPER-RESISTANT INTEGRATED CIRCUITS, AND RELATED METHODS

TECHNICAL FIELD

Embodiments disclosed herein relate to apparatuses and integrated circuits including one or more tamper-resistant features, and to related methods. More particularly, embodiments of the disclosure relate to apparatuses (e.g., microelectronic devices) comprising integrated circuits including one or more tamper-resistant features formulated and configured to exhibit a change in at least one electrical property responsive to exposure to oxygen, electromagnetic radiation, or both, and to related methods.

BACKGROUND

Microelectronic devices may include integrated circuits designed to perform various functions and processes. Integrated circuits, including processors, logic circuits, volatile memory, non-volatile memory, and other components include useful information, such as confidential, private, or personal information in memory of the integrated circuits. In addition, integrated circuits are capable of performing high level processing and data retention. As such, the integrated circuits may include signal processors, column decoders, sense amplifiers, addressing components (e.g., column addressers, row addressers), multiplexers, word line drivers, decoders (e.g., column decoders), global clocks and timing signals, self-refresh and wear leveling devices, and other components, logic and circuity. Performance of the various functions of the integrated circuits and associated microelectronic devices depend on the specific performance of the above-noted signal processors, decoders, sense amplifiers, addressing components, multiplexers, word line drivers, global clocks and timing signal, self-refresh and wear leveling devices, and other components.

Data held by integrated circuits often includes data related to the operation of the integrated circuit, including the signal paths and interconnections, timing, logic synthesis and gate-level netlist acquisition, and other data related to the logic and operation of the integrated circuit. For example, a system's firmware (permanent software programmed into read-only memory) includes the information about the system's operation and timing and is typically embedded within nonvolatile memories.

DETAILED DESCRIPTION

The illustrations included herewith are not meant to be actual views of any particular systems, microelectronic structures, microelectronic devices, or integrated circuits thereof, but are merely idealized representations that are employed to describe embodiments herein. Elements and features common between figures may retain the same numerical designation except that, for ease of following the description, reference numerals begin with the number of the drawing on which the elements are introduced or most fully described.

The following description provides specific details, such as material types, material thicknesses, and processing conditions in order to provide a thorough description of embodiments described herein. However, a person of ordinary skill in the art will understand that the embodiments disclosed herein may be practiced without employing these specific details. Indeed, the embodiments may be practiced in conjunction with conventional fabrication techniques employed in the semiconductor industry. In addition, the description provided herein does not form a complete description of a tamper-resistant feature, an integrated circuit including the tamper-resistant feature, or a microelectronic device, or a complete description of a process flow for fabricating the tamper-resistant feature, the associated integrated circuit, or microelectronic device. The structures described below do not form complete microelectronic devices or integrated circuits including tamper-resistant features. Only those process acts and structures necessary to understand the embodiments described herein are described in detail below. Additional acts to form a complete tamper-resistant feature or an integrated circuit including the tamper-resistant features may be performed by conventional techniques.

The materials described herein may be formed by conventional techniques including, but not limited to, spin coating, blanket coating, chemical vapor deposition (CVD), atomic layer deposition (ALD), plasma enhanced ALD, physical vapor deposition (PVD), plasma enhanced chemical vapor deposition (PECVD), or low pressure chemical vapor deposition (LPCVD). Alternatively, the materials may be grown in situ. Depending on the specific material to be formed, the technique for depositing or growing the material may be selected by a person of ordinary skill in the art. The removal of materials may be accomplished by any suitable technique including, but not limited to, etching, abrasive planarization (e.g., chemical-mechanical planarization), or other known methods unless the context indicates otherwise.

As used herein, the terms "longitudinal," "vertical," "lateral," and "horizontal" are in reference to a major plane of a substrate (e.g., base material, base structure, base construction, etc.) in or on which one or more structures and/or features are formed and are not necessarily defined by Earth's gravitational field. A "lateral" or "horizontal" direction is a direction that is substantially parallel to the major plane of the substrate, while a "longitudinal" or "vertical" direction is a direction that is substantially perpendicular to the major plane of the substrate. The major plane of the substrate is defined by a surface of the substrate having a relatively large area compared to other surfaces of the substrate.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped, etc.) and the spatially relative descriptors used herein interpreted accordingly.

As used herein, an "electrical property" means and includes one or more of an electrical resistance, electrical resistivity, a voltage, a current, a capacitance, an electrical conductivity, dielectric constant, dielectric strength, or another property.

As used herein, the terms "resistance" and "electrical resistance" are used interchangeably.

Integrated circuits often include valuable information. For example, integrated circuits may include personal or confidential information. In addition, integrated circuits include circuitry and algorithms for performing various operations. Due to the valuable information contained within integrated circuits (e.g., within the memory thereof), many have attempted to reverse engineer the integrated circuits to obtain the data contained therein.

Reverse engineering may include methods of obtaining a cross-section of the integrated circuit to determine the various materials and components that make up the integrated circuit. Such methods may include, for example, decapsulating the integrated circuit chip (removing potting or encapsulant materials to remove the integrated circuit from the package materials), delayering the integrated circuit, and imaging different portions of the integrated circuit. Other examples of reverse engineering include, for example, x-ray tomography, which can nondestructively provide a layer-by-layer image of the integrated circuit and is often used for the analysis of internal vias, traces, wire bonding, capacitors, contacts, and resistors. In general, such methods of reverse engineering the architecture and material compositions that make up the integrated circuit do not require powering up the integrated circuit or monitoring the function and operation of the integrated circuit and components thereof.

Other forms of reverse engineering include determining information about the circuitry and functioning of the circuits within the integrated circuit. Such methods, however, require the reverse engineer to provide power to the integrated circuit so that the integrated circuit can operate and perform its intended functions. For example, information about the circuitry and functioning of the integrated circuit may be obtained by techniques such as probing (also referred to as "picoprobing") wherein functional analysis of the integrated circuit is monitored with probes to monitor on-chip signals. In such instances, test cases may be developed and stimuli may be created for operating the system in its functional modes while monitoring the on-chip signals. Signal generators, logic analyzers, and oscilloscopes may be used to drive the system and collect the results, after which the signals and system are analyzed. By reading out and analyzing the contents of memory of an integrated circuit, reverse engineering can provide a deeper insight into the operation of the system being reverse engineered. Thus, reverse engineering includes methods by which data from such integrated circuits and electronic systems may be extracted. As noted above, such methods of reverse engineering generally require the reverse engineer to provide power to the integrated circuit so that the integrated circuit can perform one or more operations.

Tamper-resistant materials and sensors have been used to resist theft and reverse engineering of integrated circuits and their associated systems. For example, hard barriers including ceramics or steels have been used to separate a top layer of the integrated circuits so that tampering or reverse engineering attempts might be foiled by the destruction of the protective devices. To protect against picoprobing attempts, single chip coatings have also been applied. However, as the value of information potentially obtained through reverse engineering and as the complexity of semiconductor devices, integrated circuits, and microelectronic device continue to increase, reverse engineering techniques continue to improve.

According to embodiments described herein, an integrated circuit comprises one or more tamper-resistant features configured to reduce or prevent reverse engineering of the components, logic, and circuitry of the integrated circuit. The tamper-resistant features are formulated and/or configured to exhibit a change in at least one electrical property responsive to exposure to oxygen (e.g., air), electromagnetic radiation (e.g., electromagnetic radiation within the visible spectrum), or both. In some embodiments, the tamper-resistant features include one or more tamper-resistant materials in an unoxidized state (e.g., a state in which the tamper-resistant materials are not fully oxidized (e.g., partially oxidized or non-oxidized), such as materials comprising a lower than stoichiometric amount of oxygen), a photosensitive material formulated and/or configured to exhibit a change in at least one electrical property responsive to exposure to electromagnetic radiation, or both. By way of nonlimiting example, the tamper-resistant material may include, but is not limited to, titanium. When exposed to oxygen, electromagnetic radiation, or both, the tamper-resistant materials may oxidize and/or undergo a chemical change (e.g., reaction), changing at least one electrical property of the tamper-resistant materials. By way of nonlimiting example, a resistance of the tamper-resistant materials may change responsive to oxidation or exposure to electromagnetic radiation.

The tamper-resistant material may comprise a portion of a system or circuit of an integrated circuit configured to detect undesired exposure of the integrated circuit to oxygen and/or electromagnetic radiation, such as would be encountered during reverse engineering attempts of the integrated circuit. For example, during reverse engineering attempts, the chips and circuits of the integrated circuit may be exposed to electromagnetic radiation, oxygen, or both. Different components of the integrated circuit may become exposed to oxygen and electromagnetic radiation as the integrated circuit is, for example, delayered and subjected to testing, such as picoprobing techniques. Responsive to exposure to the oxygen, electromagnetic radiation, or both, the tamper-resistant material may exhibit a change in the electrical property, or electrical properties, such as resistance. A system or circuit to which the tamper-resistant material is coupled may include a sensor configured to detect (e.g., measure) the at least one electrical property and determine a change in the at least one electrical property. Responsive to determining that the at least one electrical property has changed, the sensor may be configured to output a signal which may comprise or cause one or more of an alarm/notification signal, a data corruption signal, or a self-destruct signal. Accordingly, a system including the tamper-resistant material may hinder or prevent reverse engineering by determining when the tamper-resistant material has been exposed to oxygen, electromagnetic radiation, or both and preventing the reverse engineer from accessing data and processes stored within the integrated circuitry. The system and tamper-resistant feature may facilitate protecting the data related to the functioning and circuitry of the integrated circuit. For example, the system and tamper-resistant feature may prevent a reverse engineer from reading out and analyzing the contents of memory of the integrated circuit, such as by disabling the integrated circuit from powering up responsive to the change in the at least one electrical property.

Figure 1A:
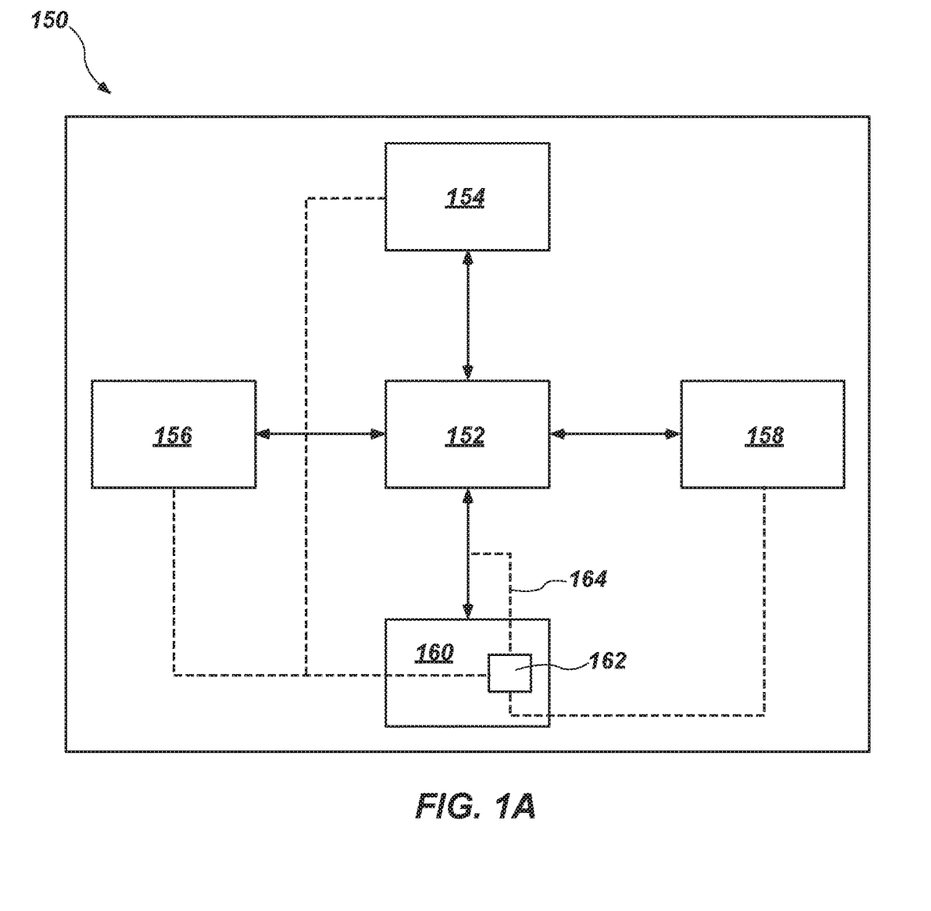
FIG. 1A is a simplified block diagram of an integrated circuit including a tamper-resistant feature, in accordance with embodiments of the disclosure.

FIG. 1A is a simplified block diagram of an integrated circuit 150, of a microelectronic device in accordance with embodiments of the disclosure. The integrated circuit 150 may comprise, for example, a semiconductor die, a memory device (e.g., including read-only memory, random access memory, or both), an application specific integrated circuit (ASIC) (e.g., a sensor), a logic circuit, a microprocessor, a microcontroller, a system on a chip (SoC), another component, or combinations thereof. One example of the integrated circuit 150, in the form of a system on a chip, may include a central processing unit (CPU) 152, read-only memory (ROM) 154, random access memory (RAM) 156, input/output devices 158 (such as for coupling the integrated circuit 150 to one or more peripheral devices), and a power up block 160. The integrated circuit 150 may include additional components, depending on the intended use and function of the integrated circuit 150.

The central processing unit 152 may include electronic circuitry for carrying out the instructions (e.g., an instruction set that may be hardwired into the circuitry of the central processing unit 152) of the integrated circuit 150 by performing various logic functions, input/output operations, and other functions. The central processing unit 152 may be in operable communication with the read-only memory 154, the random access memory 156, and then input/output devices 158. The read-only memory 154 may include, for example, programmable read-only memory (PROM), electrically programmable read-only memory (EPROM), electrically erasable programmable read-only memory (EEPROM), flash memory, or another form of read-only memory. The random access memory 156 may include, for example, dynamic random access memory (DRAM), static random access memory (SRAM), Flash memory, conductive bridge random access memory (CBRAIVI), ferroelectric random access memory (FRAM, also known as FeRAM), or other types of memory suitable for storing information.

The power up block 160 may include a circuit that initializes after a power supply is applied to the integrated circuit 150. The power up block 160 may include, for example, a power-on reset (POR) circuit. The power up block 160 may facilitate initialization of analog and digital blocks or circuits of the integrated circuit 150 responsive to receipt of a power up signal. Once a threshold voltage is applied to the power up block 160, the integrated circuit 150 is initialized and may perform one or more operations. The power up block may be in operable communication with the central processing unit 152.

The integrated circuit 150 may further include at least one tamper-resistant feature 162. The tamper-resistant feature 162 may, in some embodiments, be located within the power up block 160. The tamper-resistant feature 162 may be formulated and configured to respond when another is attempting or has attempted to reverse engineer the integrated circuit 150. In some embodiments, the tamper-resistant feature 162 is coupled to a supply voltage ($V_{DD}$) for the integrated circuit 150. The tamper-resistant feature 162 may be configured to prevent a power up signal (e.g., the supply voltage $V_{DD}$) from being provided by the power up block 160 to the central processing unit 152 responsive to the change in the at least one electrical property. For example, as indicated at 164, the tamper-resistant feature 162 may be configured to uncouple the power up block 160 from the central processing unit 152. In some such embodiments, responsive to the change in the at least one electrical property, the tamper-resistant feature 162 may prevent the integrated circuit 150 from initializing and powering up. Accordingly, a reverse engineer may be prevented from obtaining data related to the function and operation of the integrated circuit 150 responsive to the change in the at least one electrical property. In some embodiments, the tamper-resistant feature 162 is in operable communication with one or more of the central processing unit 152, the read-only memory 154, the random access memory 156, and the input/output devices 158 and may be configured to facilitate erasure of data contained within the one or more of the central processing unit 152, the read-only memory 154, the random access memory 156, and the input/output devices 158 responsive to the change in the at least one electrical property.

In some embodiments, the tamper-resistant feature 162 may physically overlie the circuitry of the power up block 160. In some such embodiments, the tamper-resistant feature 162 may be located over other components of the integrated circuit 150.

Figure 1B:
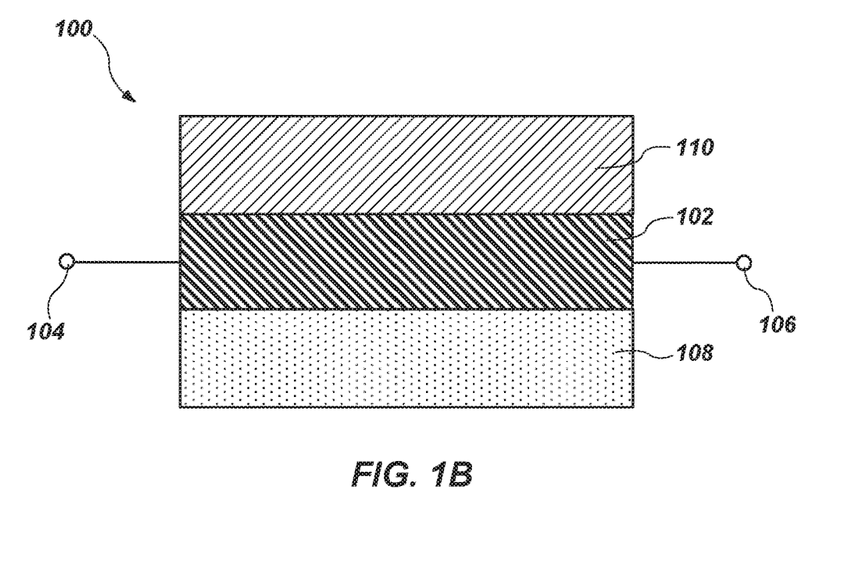
FIG. 1B is a simplified cross-sectional view of a tamper-resistant feature, in accordance with embodiments of the disclosure.

FIG. 1B is a simplified cross-sectional view of a tamper-resistant feature of an integrated circuit 100, in accordance with embodiments of the disclosure. The tamper-resistant feature of the integrated circuit 100 may include a tamper-resistant material 102 formulated and configured to exhibit a change in at least one electrical property responsive to exposure to at least one of electromagnetic radiation (such as within the visible spectrum), oxygen, or both. The tamper-resistant material 102 may be electrically coupled to a first node 104 on a first side thereof and a second node 106 at a second side thereof. The first node 104 and the second node 106 may be configured to measure the electrical property (e.g., voltage) of the tamper-resistant material 102. For example, in some embodiments, the first node 104 and the second node 106 may be electrically coupled to a voltmeter and the first node 104 and the second node 106 may be configured to determine a resistance of the tamper-resistant material 102. In some embodiments, the first node 104 may be coupled to the supply voltage $V_{DD}$ configured for applying power to the integrated circuit 150 (FIG. 1A). The supply voltage $V_{DD}$ may also provide a voltage across the tamper-resistant material 102, through which a voltage drop may be measured at the second node 106.

In some embodiments, the tamper-resistant material 102 includes a material formulated and configured to exhibit a change in at least one electrical property responsive to oxidation thereof. For example, the tamper-resistant material 102 may exhibit an increase in electrical resistance responsive to oxidation thereof. In other embodiments, the tamper-resistant material 102 exhibits a decrease in resistance responsive to oxidation. The tamper-resistant material 102 may comprise titanium, copper, aluminum, nickel, magnesium, chromium, iron, cobalt, zinc, zirconium, ruthenium, silver, hafnium, tantalum, tungsten, iridium, gold, niobium, silicon, germanium, or combinations thereof. In some embodiments, the tamper-resistant material 102 comprises titanium and the electrical resistance of the tamper-resistant material 102 is increased responsive to exposure to oxygen and a corresponding formation of titanium oxide (e.g., titanium dioxide) responsive to the oxidation of the titanium.

In some embodiments, the tamper-resistant material 102 comprises a material formulated and configured to exhibit a change in the electrical property responsive to exposure to electromagnetic radiation, such as electromagnetic radiation within the visible spectrum (having a wavelength from about 350 nm to about 650 nm). The tamper-resistant material 102 may comprise a photosensitive material such as, for example, ammonium dichromate, one or more silver halides (AgF, AgCl, AgBr, AgI), a photoconductive polymer (a material that absorbs electromagnetic radiation and produces an increase in electrical conductivity, such as, for example, poly(9-vinylcarbazole) (PVK)), a photoresist material, or combinations thereof.

The thickness (in the up and down direction in the view of FIG. 1B) of the tamper-resistant material 102 may be within a range from about 100 μm to about 500 μm, such as from about 100 μm to about 200 μm, from about 200 μm to about 300 μm, from about 300 μm to about 400 μm, or from about 400 μm to about 500 μm. However, the disclosure is not so limited and the thickness may be different than those described.

Since the tamper-resistant material 102 may comprise a material that may be oxidized responsive to exposure to oxygen (e.g., air), a material formulated to exhibit a change in at least one electrical property responsive to exposure to electromagnetic radiation, or both, the tamper-resistant material 102 of the integrated circuit 100 may be formed or deposited in an oxygen-free environment, such as in the presence of argon or under conditions such that the tamper-resistant material 102 is not exposed to visible light during or after fabrication thereof, such as by forming or depositing a shadow mask (i.e., a material opaque to visible light) over the tamper-resistant material 102.

With continued reference to FIG. 1B, the tamper-resistant material 102 may be located adjacent a base material 108. The base material 108 may include a semiconductor substrate, a base semiconductor material on a supporting substrate, a metal electrode, a semiconductor substrate having one or more materials, structures, or regions formed thereon, a semiconductor die, or combinations thereof. For example, the base material 108 may include active circuitry such as, for example, transistors, capacitors, diodes, conductive lines, other components, and combinations thereof. In some embodiments, the base material 108 includes the power up block 160 (FIG. 1A). The base material 108 may include a conventional silicon substrate or other bulk substrate including semiconductor material. As used herein, the term "bulk substrate" means and includes not only silicon wafers, but also silicon-on-insulator ("SOI") substrates, such as silicon-on-sapphire ("SOS") substrates or silicon-on-glass ("SOG") substrates, epitaxial layers of silicon on a base semiconductor foundation, or other semiconductor or optoelectronic materials, such as silicon-germanium ($Si_{1-x}Ge_x$, where x is, for example, a mole fraction between 0.2 and 0.8), germanium (Ge), gallium arsenide (GaAs), gallium nitride (GaN), or indium phosphide (InP), among others. Furthermore, when reference is made to a "substrate" or "base material" in the following description, previous process stages may have been utilized to form material, regions, or junctions in the base semiconductor structure or foundation. The base material 108 may include materials associated with integrated circuity fabrication and resulting structures. Such materials may include, for example, one or more of refractory metals, barrier materials, diffusion materials, and insulative materials. The base material 108 may include, for example, complementary metal oxide semiconductor (CMOS) structures, or other semiconductor or microelectronic structures. Different portions of the base material 108 may be electrically isolated from each other by one or more dielectric materials.

An encapsulant material 110 may be located adjacent to (e.g., overlie) the tamper-resistant material 102. The encapsulant material 110 may comprise a sealing material and may, for example, hermetically seal the integrated circuit 100 to prevent or reduce contamination thereof (such as by exposure to oxygen, visible light, or contaminants such as water). In some embodiments, the encapsulant material 110 substantially surrounds the tamper-resistant material 102.

The encapsulant material 110 may include silicon dioxide, silicon nitride, a silicon oxynitride, an epoxy material, a polyimide, silicone, another dielectric material, or combinations thereof. The encapsulant material 110 may, for example, reduce or prevent oxidation of the tamper-resistant material 102, reduce or prevent exposure of the tamper-resistant material 102 to electromagnetic radiation within a particular range of wavelengths (e.g., the encapsulant material 110 may comprise the shadow mask), or both.

During reverse engineering attempts, the encapsulant material 110 may be removed by a reverse engineer to access components of the integrated circuit 100 (such as components within the base material 108), exposing the tamper-resistant material 102 to oxygen, electromagnetic radiation, or both. Exposing the tamper-resistant material 102 to one or more of oxygen or electromagnetic radiation may change one or more electrical properties of the tamper-resistant material 102, which may be detected (e.g., sensed) through the first node 104 and the second node 106, each of which is electrically coupled to the tamper-resistant material 102, to indicate that the integrated circuit 100 is or may be compromised. In some such embodiments, as will be described herein, the integrated circuit 100 may include a logic (e.g., a control system) or may be coupled with a system for causing one or more actions responsive to the change in the electrical property of the tamper-resistant material 102.

Figure 1C:
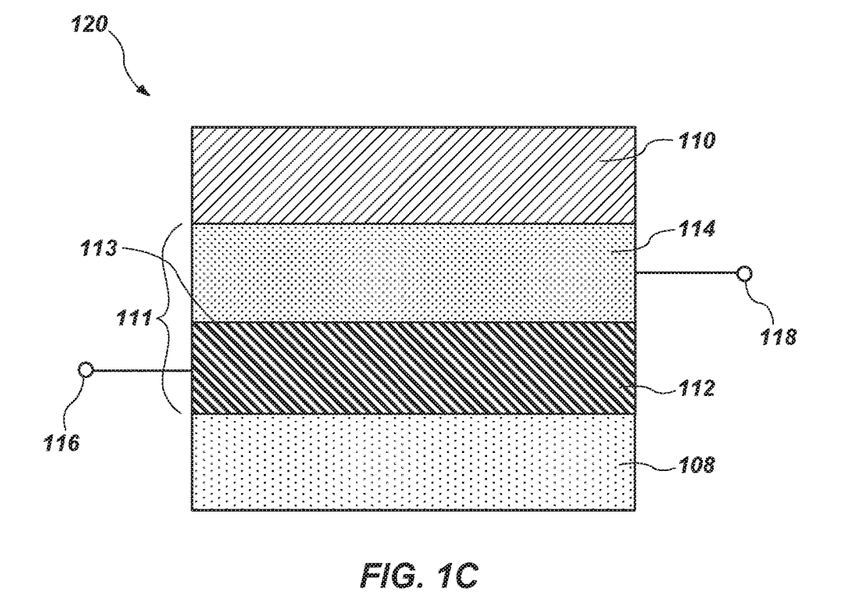
FIG. 1C is a simplified cross-sectional view of another tamper-resistant feature, in accordance with embodiments of the disclosure.

FIG. 1C is a simplified cross-sectional view of another tamper-resistant feature of an integrated circuit 120, in accordance with embodiments of the disclosure. The integrated circuit 120 may include a stack 111 comprising multiple tamper-resistant materials, for example a first tamper-resistant material 112 and a second tamper-resistant material 114 located adjacent to the first tamper-resistant material 112. The first tamper-resistant material 112 may be located adjacent to the second tamper-resistant material 114 at least along interface 113. The stack 111 may be adjacent to the base material 108, which may be substantially the same as the base material 108 described above with reference to FIG. 1B.

The first tamper-resistant material 112 may include a material formulated and configured to exhibit a change in at least one electrical property responsive to oxidation and the second tamper-resistant material 114 may include a material formulated and/or configured to exhibit a change in at least one electrical property responsive to exposure to electromagnetic radiation. The first tamper-resistant material 112 may include one or more materials described above with reference to the tamper-resistant material 102 and formulated and/or configured to exhibit a change in the electrical property responsive to oxidation. The second material tamper-resistant 114 may include one or more materials formulated and/or configured to exhibit a change in the electrical property responsive to exposure to electromagnetic radiation and may include one or more different materials described above with reference to the tamper-resistant material 102.

A thickness of each of the first tamper-resistant material 112 and the second tamper-resistant material 114 (in the up and down direction in the view of FIG. 1C) may be substantially the same as the thickness of the tamper-resistant material 102 described above, or a combined thickness of the first tamper-resistant material 112 and the second tamper-resistant material 114 may be substantially the same as the above-mentioned thickness.

The first tamper-resistant material 112 may be electrically coupled to a first node 116 and the second tamper-resistant material 114 may be electrically coupled to a second node 118, which may be located on an opposite side of the stack 111 as the first node 116. The first node 116 and the second node 118 may be configured to measure at least one electrical property of at least one of the first tamper-resistant material 112 and the second tamper-resistant material 114. Stated another way, the first node 116 and the second node 118 may be configured to measure the electrical property of the stack 111. In some embodiments, the first node 116 is configured to receive the supply voltage $V_{DD}$ of the integrated circuit 150 (FIG. 1A). The electrical property of the stack 111 may change if one or both of the first tamper-resistant material 112 and the second tamper-resistant material 114 exhibit a change the electrical property, such as responsive to oxidation or exposure to electromagnetic radiation. For example, in at least some embodiments, the first tamper-resistant material 112 and the second tamper-resistant material 114 may be exposed to oxygen and electromagnetic radiation during reverse engineering attempts. Responsive to such exposure, one or both of the first tamper-resistant material 112 and the second tamper-resistant material 114 may exhibit a change in the one electrical property, which may be sensed to determine a risk of reverse engineering.

As described above with reference to FIG. 1B, the integrated circuit 120 may include an encapsulant material 110 adjacent the second tamper-resistant material 114. Although not illustrated, the encapsulant material 110 may be located adjacent sidewalls of the stack 111. In other words, the stack 111 (the first tamper-resistant material 112 and the second encapsulant material 114) may not include any exposed surfaces.

Figure 1D:
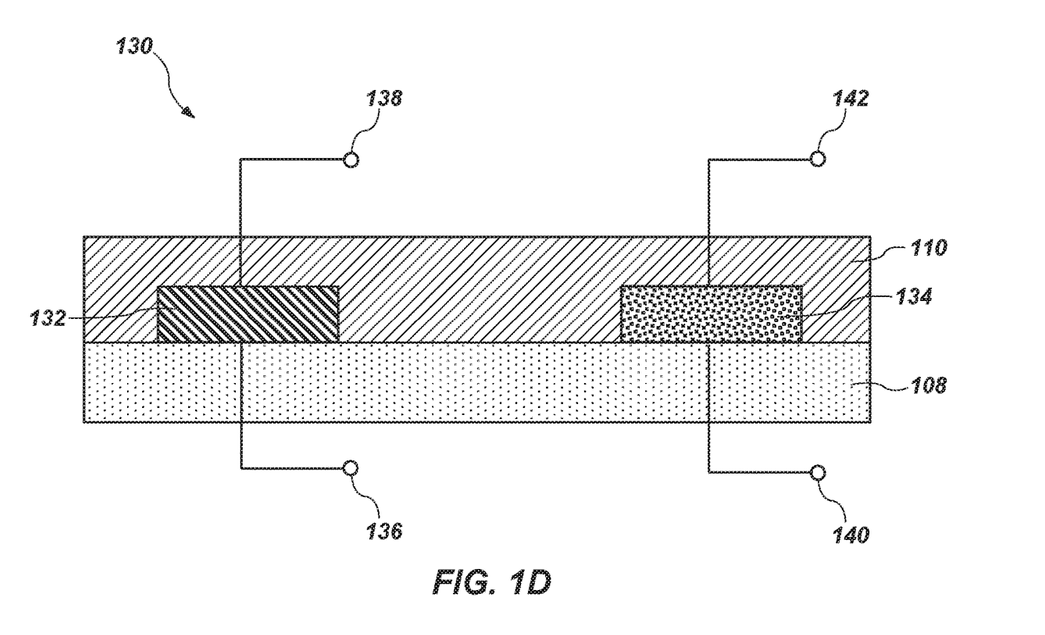
FIG. 1D is a simplified cross-sectional view of another tamper-resistant feature, in accordance with additional embodiments of the disclosure.

FIG. 1D is a simplified cross-sectional view of another tamper-resistant feature of an integrated circuit 130 including tamper-resistant materials, in accordance with additional embodiments of the disclosure. The integrated circuit 130 may include a first tamper-resistant material 132 and a second tamper-resistant material 134 surrounded (e.g., encapsulated) by the encapsulant material 110, which may be substantially the same as the encapsulant materials 110 described above. The first tamper-resistant material 132 may be physically isolated from the second tamper-resistant material 134. In some embodiments, one of the first tamper-resistant material 132 and the second tamper-resistant material 134 may comprise a material formulated and configured to exhibit the change in the electrical property responsive to oxidation thereof and the other of the first tamper-resistant material 132 and the second tamper-resistant material 134 may comprise a material formulated and configured to exhibit the change in the electrical property responsive to exposure to electromagnetic radiation.

The first tamper-resistant material 132 may be electrically coupled to a first node 136 and a second node 138. The supply voltage $V_{DD}$ may be applied to the first tamper-resistant material 132 through, for example, the first node 136 and a voltage may be measured at the second node 138. Thus, a voltage drop across the first tamper-resistant material 132 may be measured based on a difference in voltage at the first node 136 and the second node 138.

The second tamper-resistant material 134 may be electrically coupled to a third node 140 and a fourth node 142. The supply voltage $V_{DD}$ may be applied to the second tamper-resistant material 134 through, for example, the third node 140 and a voltage may be measured at the fourth node 142. Thus, a voltage drop across the second tamper-resistant material 134 may be measured based on a difference in voltage at the third node 140 and the fourth node 142. In some embodiments, both of the first node 136 and the third node 140 are independently couplable to the supply voltage $V_{DD}$.

The first tamper-resistant material 132 and the second tamper-resistant material 134 may be located over the base material 108, as described above with reference to FIG. 1B and FIG. 1C.

The tamper-resistant features of integrated circuits 100, 120, 130 described above with reference to FIG. 1B through FIG. 1D may be fabricated by, for example, forming or depositing the respective ones of the tamper-resistant materials 102, 112, 114, 132, 134 over the base material 108, which may comprise a component of the integrated circuit 150 (FIG. 1A), such as the power up block 160 (FIG. 1A). The tamper-resistant materials 102, 112, 114, 132, 134 may be deposited or formed in situ by, for example, ALD, plasma enhanced ALD, PVD, PECVD, LPCVD, another method, or combinations thereof. The encapsulant material 110 may be formed or deposited over the tamper-resistant materials 102, 112, 114, 132, 134 by ALD, PVD, PECVD, LPCVD, another method, or combinations thereof.

The tamper-resistant features of integrated circuits 100, 120, 130 may be used with, for example, any integrated circuit, such as a semiconductor die, an ASIC, a logic circuit, a microelectronic device, a microprocessor, a microcontroller, an SoC, another component, or combinations thereof. Other integrated circuits may include one or more forms of memory, such as, for example, volatile memory, non-volatile memory, or both. For example, such integrated circuits may include DRAM, SRAM, Flash memory, CBRAM, FeRAM, PROM, EEPROM, or other forms of memory.

Figure 2A:
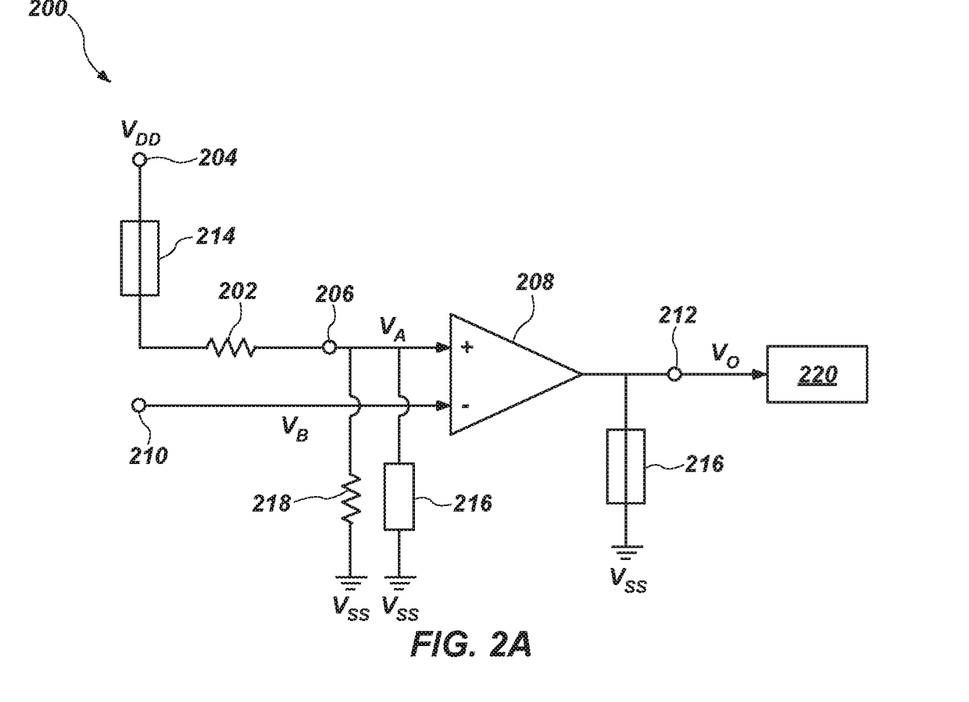
FIG. 2A is a simplified circuit diagram of a sensor for determining a state of an integrated circuit by determining a change in at least one electrical property of tamper-resistant materials, in accordance with embodiments of the disclosure.

FIG. 2A is a simplified circuit diagram of a system 200 for determining a state of the integrated circuit 150 (FIG. 1A) by determining the change in the electrical property of the associated tamper-resistant materials 102, 112, 114, 132, 134, in accordance with embodiments of the disclosure. The system 200 may include a resistor 202 coupled between a first node 204 configured to receive a supply voltage $V_{DD}$ (also referred to as a power source voltage) and a second node 206 configured to provide an input voltage $V_A$ to a sensor 208. Accordingly, a first end of the resistor 202 may be configured to receive the supply voltage $V_{DD}$. The input voltage $V_A$ may correspond to the voltage at a second end of the resistor 202.

The resistor 202 may comprise one or more of the tamper-resistant materials 102, 112, 114, 132, 134 described above with reference to FIG. 1B through FIG. 1D. For example, the resistor 202 may comprise a material formulated and configured to exhibit a change in at least one electrical property responsive to exposure to oxygen, electromagnetic radiation, or both. In some embodiments, the resistor 202 may be configured to exhibit an increase in electrical resistance responsive to exposure to oxygen or electromagnetic radiation. In other embodiments, the resistor 202 may be configured to exhibit a decrease in electrical resistance responsive to exposure to oxygen or electromagnetic radiation.

For a constant supply voltage $V_{DD}$, the resistance of the resistor 202 may directly affect the value (magnitude) of the input voltage $V_A$. In other words, the supply voltage $V_{DD}$ may exhibit a voltage drop (or a voltage increase) across the resistor 202. Accordingly, in some embodiments, the resistance of the resistor 202 (e.g., the tamper-resistant materials 102, 112, 114, 132, 134) may correspond to the value of the input voltage $V_A$. Stated another way, the input voltage $V_A$ may correspond to a condition of the resistor 202, such as whether the resistor 202 includes any materials, the characteristics of which have been compromised by oxidation, exposure to electromagnetic radiation, or both. In some embodiments, comparison of the supply voltage $V_{DD}$ to the input voltage $V_A$ may provide an indication of the resistance of the resistor 202 and a condition of the tamper-resistant material.

The sensor 208 may be in operable communication with the second node 206 and a third node 210 having a reference voltage $V_B$. In some embodiments, the sensor 208 comprises a comparator. In other embodiments, the sensor 208 comprises, for example, a differential amplifier. Where the sensor 208 comprises a comparator, for example, a non-inverting input (e.g., $V_A$) of the sensor 208 may be coupled to the second node 206, and an inverting input (e.g., $V_B$) of the sensor 208 may be coupled to the third node 210. The sensor 208 may be configured to receive and compare the relative magnitude of the input voltage $V_A$ to the reference voltage $V_B$. In some embodiments, an output signal $V_O$ at a fourth node 212 corresponding to an output node of the sensor 208 may comprise a digital signal (either a 1 or a 0, depending on the magnitudes of $V_A$ and $V_B$). By way of nonlimiting example, an output signal $V_O$ of 0 may indicate that the value of $V_A$ is less than the value of $V_B$. An output signal $V_O$ of 1 may indicate that the value of $V_A$ has exceeded the value of $V_B$ (and that the value of $V_A$ has changed). In use and operation, a change in the output signal $V_O$ may correspond to a change in a condition of the resistor 202. In some such embodiments, the sensor 208 may be configured to determine a change in the condition of the resistor 202 based on the value of the output signal $V_O$. In some embodiments, the sensor 208 may be configured to determine a change in the condition of the resistor 202 based on a comparison of the reference voltage $V_B$ to one or both of the input voltage $V_A$ or the supply voltage $V_{DD}$.

The fourth node 212 having the output signal $V_O$ may be in electrical communication with a control system 220 or logic configured to provide a response action responsive to a change in the output signal $V_O$. As will be described herein, the control system 220 may be configured to send an indication to another system, such as another component of the integrated circuit 150, to perform one or more actions responsive to determining that the resistor 202 has been exposed to oxygen, electromagnetic radiation, or both. In some embodiments, the control system 220 is in operable communication with the power up block 160 and may be configured to prevent the power up block 160 from providing power to the integrated circuit 150. The control system 220 may also be in operable communication with one or more of the central processing unit 152, the read-only memory 154, the random access memory 156, and the input/output devices 158 which may be configured to perform one or more erase operations responsive to receiving a signal from the control system 220. Accordingly, the control system 220 may be configured to erase data located within the integrated circuit 150 responsive to the change in the at least one electrical property of the resistor 202.

The control system 220 may enable the user to determine an action of the control system 220 responsive to a change in the output signal $V_O$. For example, if the output signal $V_O$ is 0, the control system 220 may be configured to provide power to the integrated circuit 100, 120, 130. If the output signal $V_O$ is, for example, 1, the control system 220 may be configured to prevent the integrated circuit 100, 120, 130 from powering up. Responsive to a change in the output signal $V_O$, the system 200 may be configured to perform one or more actions. The one or more actions may include sending a notification to a user of the integrated circuit indicative of a reverse engineering attempt (as indicated by the change in the at least one electrical property of the resistor 202), corrupting data stored within the integrated circuit, or sabotaging one or more components of the integrated circuit. In some embodiments, the notification may be sent to the control system 220 via a specific scrambled output on the data pins, by alert pin firing, or both to identify a reverse engineering attempt on the integrated circuit 100, 120, 130. If the reverse engineering attempt is while the integrated circuit 100, 120, 130 is in use by a consumer (e.g., the reverse engineer is breaking into the memory from a platform of the consumer), the control system 220 may be programmed by the consumer to take a particular action once the reverse engineering has been detected by the integrated circuit 100, 120, 130.

In some embodiments, the control system 220 is configured to send a signal to a component of the integrated circuit 150 (FIG. 1A) to erase data on one or more components of the integrated circuit 150 responsive to the output signal $V_O$ changing from a 0 to a 1. Accordingly, the control system 220 may be configured to erase data stored within the memory of the integrated circuit 150, such as by performing an erase operation. In other embodiments, the control system 220 may be configured to corrupt the data stored in the memory, such as by writing random logic bits to the memory. In some embodiments, the data corruption may be permanent. In other embodiments, the data corruption may be reversible and the data stored in the memory may be retained.

In yet other embodiments, the control system 220 may be configured to sabotage (e.g., self-destruct) the integrated circuit 150 (FIG. 1A) responsive to the change in the at least one electrical property. In some such embodiments, the integrated circuit 150 may include one or more materials formulated and configured to destroy one or more electrical interconnections within the integrated circuit 150. By way of nonlimiting example, the integrated circuit 150 may include at least one etchant such as at least one acid (hydrochloric acid, hydrofluoric acid, sulfuric acid, nitric acid, phosphoric acid, acetic acid, or another acid), at least one base (hydrogen peroxide, ammonium hydroxide), or other etchants formulated and configured to remove or damage at least one conductive line (e.g., polysilicon, copper, tungsten, titanium, silver, gold) or conductive interconnect. The at least one etchant may be located within cavities of the integrated circuit 100, 120, 130 or may be located proximate the integrated circuit 100, 120, 130.

Figure 2B:
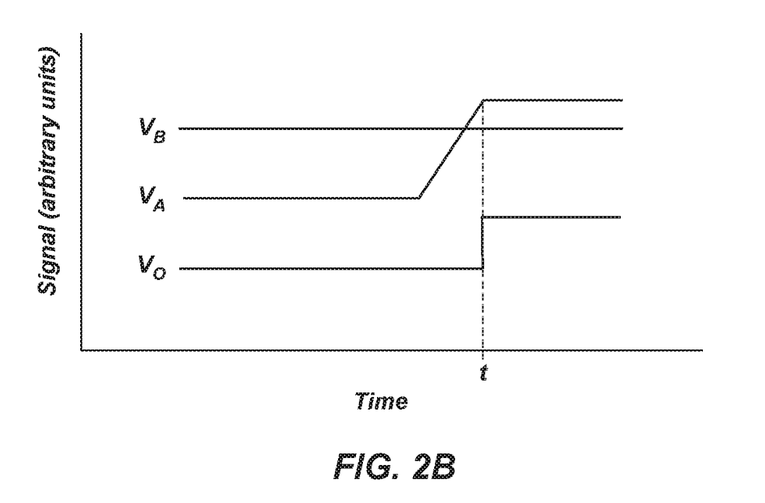
FIG. 2B is a simplified graph illustrating an input voltage $V_A$, a reference voltage $V_B$, and an output signal $V_O$ of a sensor as a function of time, in accordance with embodiments of the disclosure.

FIG. 2B is a simplified graph illustrating the input voltage $V_A$, the reference voltage $V_B$, and the output signal $V_O$ as a function of time. At time t, the input voltage $V_A$ exceeds the reference voltage $V_B$, indicating a change the one electrical property of the resistor 202 (such as by oxidation). At such time t, a state of output signal $V_O$ switches responsive to the input voltage $V_A$ exceeding the reference voltage $V_B$. The change in the output signal $V_O$ may be an indication of exposure of the resistor 202 to oxygen, electromagnetic radiation, or both. In some embodiments, the magnitude of the reference voltage $V_B$ may be selected such that effects of noise are reduced. In other words, the magnitude of the reference voltage $V_B$ may be selected such that the resistance of the resistor 202 changes a sufficient amount prior to the output signal $V_O$ changing responsive to the change in the resistance.

In use and operation, the supply voltage $V_{DD}$ is applied to the resistor 202, resulting in a voltage drop from the supply voltage $V_{DD}$ to the input voltage $V_A$. The sensor 208 receives the input voltage $V_A$ and the reference voltage $V_B$ and compares the relative magnitudes of the input voltage $V_A$ and the reference voltage $V_B$. The output signal $V_O$ may correspond to the state of the resistor 202. In other words, the value of the output signal $V_O$ may indicate a change in at least one electrical property of the resistor 202, such as may be caused by oxidation thereof, exposure thereof to electromagnetic radiation, or both.

As only one example, where the resistor 202 comprises a material formulated and configured to exhibit a change the electrical property responsive to exposure to oxygen, an electrical resistance of the material may change responsive to oxidation. For example, a resistance of titanium may increase when exposed to oxygen (since a resistance of titanium dioxide is greater than a resistance of elemental titanium). In some such embodiments, the input voltage $V_A$ may decrease responsive to an increase of the resistance of the resistor 202. Detection of a predetermined decrease in the input voltage $V_A$ such that a relative magnitude of the input voltage $V_A$ exceeds that of the reference voltage $V_B$, may be an indication of reverse engineering. In other embodiments, the input voltage $V_A$ may increase responsive to exposure to oxygen, electromagnetic radiation, or both.

In some embodiments, it may be desired to include the tamper-resistant materials 102, 112, 114, 132, 134 in the tamper-resistant features of integrated circuits 100, 120, 130 during early stages of product development, such as during fabrication of early samples of the integrated circuit 150 (FIG. 1A). In some embodiments, it may be desirable to include the tamper-resistant materials 102, 112, 114, 132, 134 in integrated circuits shipped to high risk customers, who may attempt to reverse engineer the integrated circuit. However, it may not be desired for the system 200 to be enabled to function in all integrated circuits 150 that are produced. Accordingly, with continued reference to FIG. 2A, the system 200 may include a first fuse 214 in operable communication with the first node 204. The first fuse 214 may be configured to enable the system 200 responsive to application of a suitable threshold voltage to the first fuse 214. Application of the threshold voltage may electrically connect the supply voltage $V_{DD}$ to the resistor 202. In other words, the first fuse 214 may be faulted (e.g., blown) by application of the threshold voltage to couple the supply voltage $V_{DD}$ to the resistor 202 and enable the system 200. Accordingly, the system 200 may not be enabled until a desired signal is received by the system 200 to blow the first fuse 214. In other embodiments, rather than including the first fuse 214, the system 200 may include a switch (e.g., a transistor, such as a NMOS transistor or a PMOS transistor) configured to couple the supply voltage $V_{DD}$ to the resistor 202.

A second fuse 216 may be configured to disable the system 200 after a desired amount of time. The second fuse 216 may be in electrical communication a ground voltage $V_{SS}$ and may be configured to disable the system 200 by faulting (e.g., blowing) the second fuse 216 and connecting the second node 206 to the ground voltage $V_{SS}$. For example, after the integrated circuit 100, 120, 130 is sent back to a supplier, the supplier may desire to disable the system 200, such as by faulting the second fuse 216 to electrically connect the second node 206 and the input to the sensor 208 to the ground voltage $V_{SS}$.

In some embodiments, the first node 206 may be in electrical communication with another resistor 218, which may also be referred to herein as a so-called "pull down" resistor. The another resistor 218 may be configured to provide a current to the sensor 208 when the resistor 202 is not coupled to the supply voltage $V_{DD}$ (such as before the first fuse 214 is faulted).

Although FIG. 2A has been described and illustrated as including a sensor 208 comprising a comparator, the disclosure is not so limited. In some embodiments, the system 200 is configured to determine a change in the electrical property of the resistor 202 (e.g., a resistance) by comparing a voltage at the second node 206 to a baseline value of the voltage at the second node 206. Stated another way, the system 200 may be configured to detect a change in the voltage exiting the resistor 202 or a voltage drop across the resistor 202. In some such embodiments, sensor 208 may be configured for detecting a change in voltage, such as a change in the input voltage $V_A$.

In other embodiments, where the sensor 208 comprises a differential amplifier, the output signal $V_O$ at the fourth node 212 may correspond to a difference between the input voltage $V_A$ and the reference voltage $V_B$. In use and operation, a change in the output signal $V_O$ may correspond to a change in a condition (e.g., a resistance) of the resistor 202. In some such embodiments, the differential amplifier may be configured to determine a change in the condition of the resistor 202 based on the value of the output signal $V_O$. The control system 220 may be configured to generate a response action responsive to the output signal $V_O$ exceeding a predetermined voltage. If the output signal $V_O$ is less than the predetermined value (or if the input voltage $V_A$ has not changed more than a predetermined amount), the control system 220 may be configured to provide the power to the integrated circuit 150 (FIG. 1A). A predetermined value may be selected such that effects of noise do not cause control system 220 to generate the response action responsive to the effects of noise.

If the output signal $V_O$ is greater than the predetermined value, the control system 220 may be configured to prevent the integrated circuit from powering up. Responsive to a change in the output signal $V_O$ or the output signal $V_O$ exceeding or deviating from the predetermined value, the system 200 may be configured to perform one or more actions, such as one or more of sending a notification to a user of the integrated circuit indicative of a reverse engineering attempt (as indicated by the change in the at least one electrical property of the resistor 202), corrupting data stored within the integrated circuit, or sabotaging one or more components of the integrated circuit, as described above.

In use and operation, the differential amplifier compares the input voltage $V_A$ to the reference voltage $V_B$. The output signal $V_O$ of the differential amplifier may be based on a difference between the input voltage $V_A$ and the reference voltage $V_B$ (e.g., $V_B-V_A$) and may correspond to the state of the resistor 202. In other words, the value of the output signal $V_O$, or a change in the value of the output signal $V_O$, may indicate a change in at least one electrical property of the resistor 202, such as may be caused by oxidation thereof, exposure thereof to electromagnetic radiation, or both.

In other embodiments, the system 200 may include any circuit configured to detect (e.g., measure) a change in at least one electrical property of the resistor 202. By way of nonlimiting example, the system 200 may include an operational amplifier or a sense amplifier configured to detect changes in voltage, changes in capacitance, or a combination thereof.

In some embodiments, the system 200 may include a voltage divider (also referred to as a resistor divider) to provide a reference voltage to the sensor 208, which may facilitate detection of a change in resistance of the resistor 202, as will be described with reference to FIG. 3A.

Although FIG. 2A has been described and illustrated as including only one resistor 202, the disclosure is not so limited. In other embodiments, the system 200 may include more than one resistor 202. For example, the system 200 may include the integrated circuit 130 described above with reference to FIG. 1D and may include a first resistor corresponding to the first tamper-resistant material 132 and a second resistor corresponding to the second tamper-resistant material 134. In some such embodiments, the system 200 may be configured to determine a change in at least one electrical property of each of the first resistor and the second resistor. The first resistor and the second resistor may be coupled in series, may be coupled in parallel, or may be individually coupled to a separate comparator.

Figure 3A:
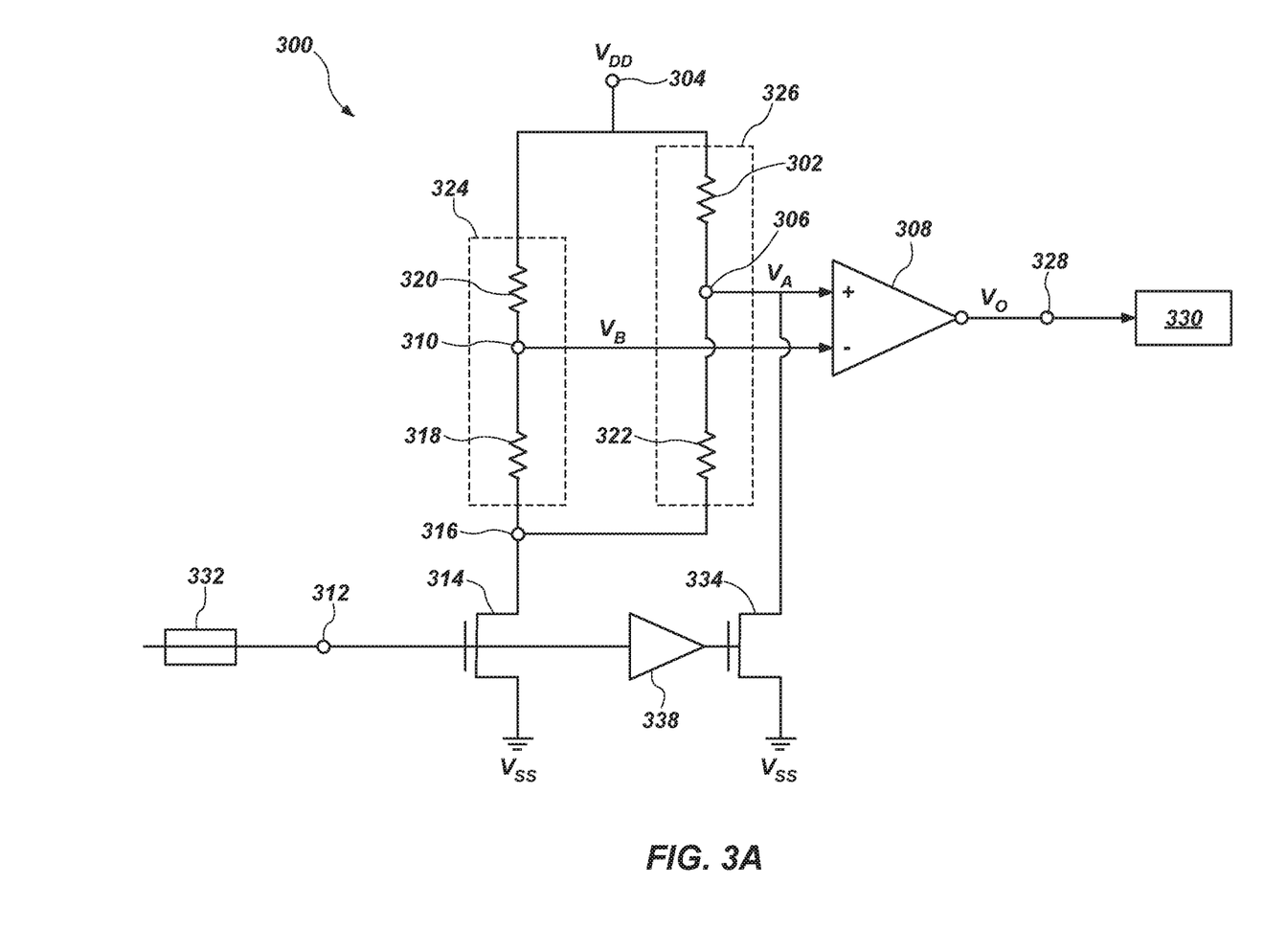
FIG. 3A is a simplified circuit diagram of a system for determining a state of an integrated circuit, in accordance with embodiments of the disclosure.

FIG. 3A is a simplified circuit diagram of a system 300 for determining a state of the integrated circuit 150 (FIG. 1A) by determining a change in at least one electrical property of the associated tamper-resistant materials 102, 112, 114, 132, 134, in accordance with embodiments of the disclosure. The system 300 comprises a first resistor 302 coupled between a first node 304 configured to receive a supply voltage $V_{DD}$ and a second node 306 configured to have an input voltage $V_A$. In use and operation, a voltage drop occurs across the first resistor 302 and the input voltage $V_A$ has a magnitude less than that of the supply voltage $V_{DD}$. The first resistor 302 may be substantially the same as the resistor 202 described above with reference to FIG. 2A. For example, the first resistor 302 may comprise one or more tamper-resistant materials 102, 112, 114, 132, 134 described above.

A sensor 308 may be in electrical communication with the second node 306 and a third node 310 having a reference voltage $V_B$. Thus, the sensor 308 may be configured to receive the input voltage $V_A$ and a reference voltage $V_B$. The sensor 308 may be substantially the same as the sensor 208 described above with reference to FIG. 2A. For example, in some embodiments, the sensor 308 comprises a comparator. In other embodiments, the sensor 308 comprises a differential amplifier, an operational amplifier, or a sense amplifier.

The system 300 may include a first voltage divider 324 comprising the third node 310 between a second resistor 318 and a third resistor 320 and a second voltage divider 326 including the second node 306 located between the first resistor 302 and a fourth resistor 322. In some embodiments, the resistance of the first resistor 302 is less than a resistance of the second resistor 318, the third resistor 320, and the fourth resistor 322. A relative value of the resistances of each of the first resistor 302, the second resistor 318, the third resistor 320, and the fourth resistor 322 may be selected to reduce or eliminate the effects of noise on the sensor 308. For example, if exposure of the first resistor 302 to oxygen or electromagnetic radiation increases the resistance of the first resistor 302, the resistance of the second resistor 318 may be equal to about the resistance of the fourth resistor 320 and the resistance of the third resistor may be greater than the resistance of the first resistor 302. In some embodiments, if exposure of the first resistor 302 to oxygen or electromagnetic radiation decreases the resistance of the first resistor 302, the resistance of the third resistance 320 may be equal to about the resistance of the first resistor 302 and the resistance of the second resistor 318 may be greater than the resistance of the fourth resistor 322. However, the disclosure is not so limited and, the relative resistance of the resistors 302, 318, 320, 322 may be different than those described.

A fourth node 312 may be coupled to an enable signal, which signal may enable operation of the system 300. A fifth node 316 may be coupled to a ground voltage $V_{SS}$ through a first transistor 314 when the first transistor 314 is on.

In embodiments where the sensor 308 comprises a comparator, an output signal $V_O$ at a sixth node 328 corresponding to an output node of the sensor 308 may comprise a digital signal (either a 1 or a 0, depending on the relative magnitudes of $V_A$ and $V_B$). In some such embodiments, the output signal $V_O$ may change values when a value of the input signal $V_A$ crosses the value of the reference signal $V_B$.

In other embodiments, such as where the sensor 308 comprises a differential amplifier, the output signal $V_O$ corresponds to a difference between the input voltage $V_A$ and the reference voltage $V_B$. In some such embodiments, during use and operation, a change in the output signal $V_O$ may correspond to a change in a condition of the first resistor 302 and the differential amplifier may be configured to determine a change in the condition of the first resistor 302 based on the value of the output voltage $V_O$.

The sixth node 328 configured to receive the output signal $V_O$ from the sensor 308 may be in electrical communication with a control system 330 or logic configured to provide a response action responsive to the output voltage $V_O$ having a value of 1 (such as when the sensor 308 comprises a comparator), changing by more than a predetermined voltage (such as when the sensor 308 comprises a differential amplifier), or responsive to a change in the input voltage $V_A$. The control system 330 may be configured to send an indication to a user that the integrated circuit has been tampered with responsive to detection of the change in the output signal $V_O$. As will be described herein, the control system 330 may enable the user to determine an action of the control system 330 responsive to the output signal $V_O$ exceeding the predetermined value. If the output signal $V_O$ is less than the predetermined value (or if the input voltage $V_A$ has not changed more than a predetermined amount), the control system 330 may be configured to provide the power to the integrated circuit.

As described above with reference to the system 200, the system 300 may include fuses to enable the system 300. For example, a first fuse 332 may be in operable communication with the fourth node 312. The first fuse 332 may be configured to enable the system 300 responsive to application of a suitable threshold voltage to the first fuse 332. In some embodiments, the fourth node 312 may not receive the signal until the first fuse 332 is blown. Application of the threshold voltage may electrically connect the fourth node 312 to an enable signal.

Figure 3B:
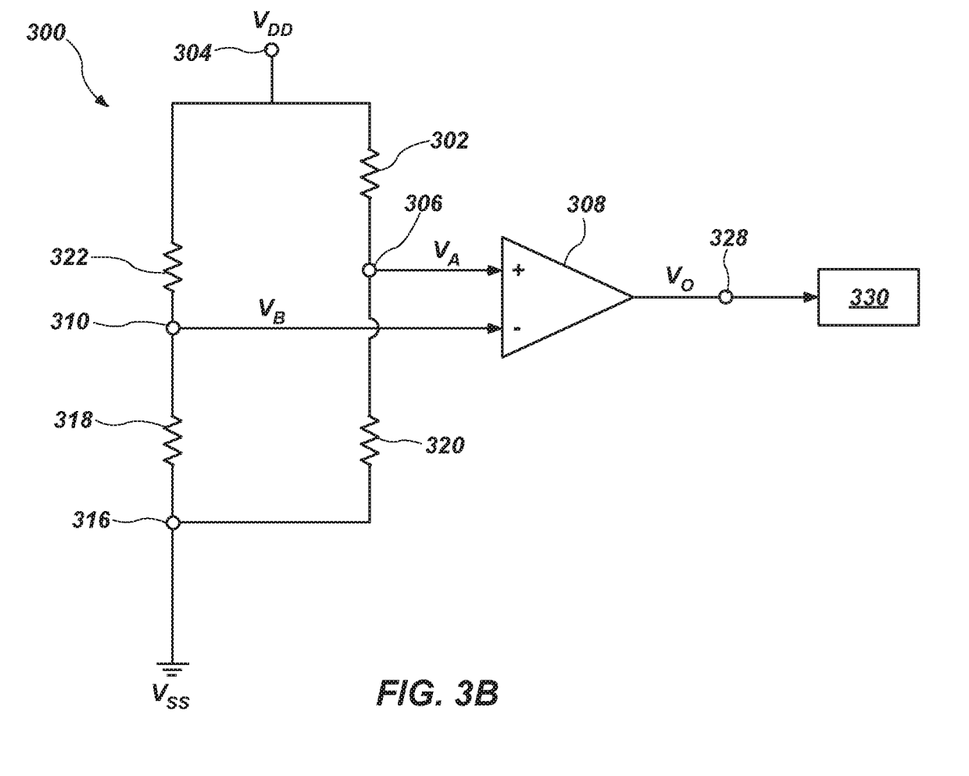
FIG. 3B is a simplified circuit diagram of the system of FIG. 3A in an enabled state, in accordance with embodiments of the disclosure.

FIG. 3B is a simplified circuit diagram of the system 300 in an enabled state, in accordance with embodiments of the disclosure. In some such embodiments, the high enable signal may turn the first transistor 314 on and electrically connect the fifth node 316 to the ground voltage $V_{SS}$ (i.e., via the first transistor 314).

Figure 3C:
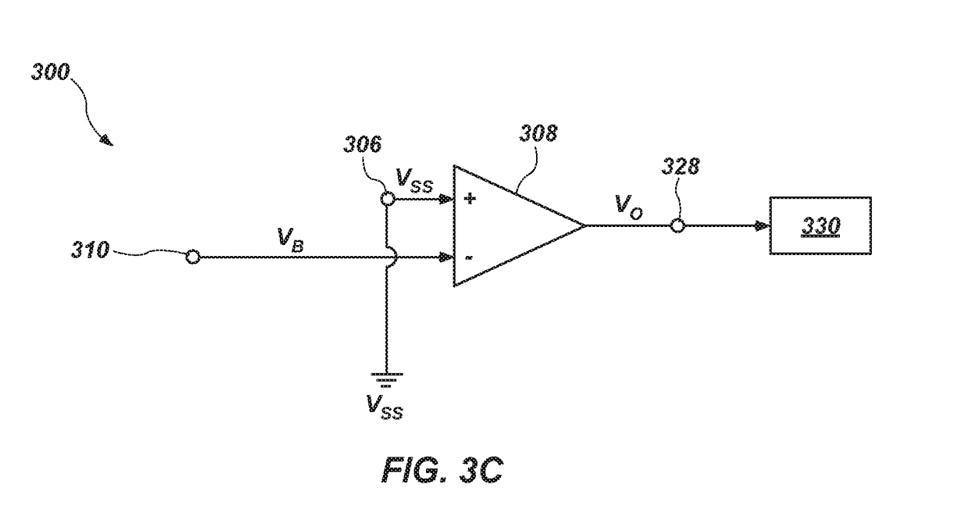
FIG. 3C is a simplified circuit diagram of the system of FIG. 3A is disabled, in a disabled stated, in accordance with embodiments of the disclosure.

When it is desired to disable the system 300, the fourth node 312 may be configured to receive a low enable voltage. FIG. 3C is a simplified circuit diagram of the system 300 in a disable state, in accordance with embodiments of the disclosure. When the system 300 is disabled, the first transistor 314 may be off. An inverter 338, located between the first transistor 314 and a second transistor 334 (FIG. 3A) may be configured to receive the low enable signal and invert the signal. The inverted signal turns the second transistor 334 on such that the second node 306 connects to the ground voltage $V_{SS}$ through the second transistor 334.

Accordingly, an integrated circuit may include one or more tamper-resistant materials, which may facilitate detection of reverse engineering attempts of the integrated circuit. The tamper-resistant materials may be formulated and configured to exhibit a change in at least one electrical property responsive to exposure to oxygen, electromagnetic radiation, or both. The integrated circuit may include a system configured to detect the change in the at least one electrical property and perform one or more operations responsive to detecting the change. The tamper-resistant materials may facilitate protection of valuable intellectual property by reducing or preventing reverse engineering attempts. The integrated circuits may include fuses, which may configured to enable the tamper-resistant features of the integrated circuits when the integrated circuits are shipped to high risk consumers who may attempt to steal the intellectual property within the integrated circuits. The fuses may be disabled when the integrated circuits are sent to lower risk consumers, such as when the integrated circuits are manufactured and sold in high volumes to the general public. In addition, the change in the electrical property of the tamper-resistant material may be measured to determine whether attempts to reverse engineer the integrated circuit have been made.

Accordingly, in at least some embodiments, an apparatus (e.g., a microelectronic device) comprises a material within an integrated circuit coupled to a supply voltage for the integrated circuit and configured to exhibit a change in at least one electrical property responsive to exposure to oxygen, electromagnetic radiation, or both, and a sensor within the integrated circuit configured to identify the change in the at least one electrical property of the material and to generate an output signal responsive to the change in the at least one electrical property of the material.

Accordingly, in at least some embodiments, an apparatus comprises a resistor within an integrated circuit and coupled between a first node coupled to receive a supply voltage and a second node, the resistor comprising a material formulated and configured to exhibit a change in at least one electrical property responsive to exposure to oxygen, exposure to electromagnetic radiation, or both, a third node, and a sensor within the integrated circuit and configured to compare a reference voltage at the third node and an input voltage at the second node.

Accordingly, in at least some embodiments, a method comprises applying a supply voltage at a first node coupled to a first end of a resistor to generate an input voltage at a second node coupled to a second end of the resistor, the resistor comprising a material formulated and configured to exhibit a change in resistance responsive to exposure to oxygen, electromagnetic radiation, or both, identifying, with a sensor, the change in the at least one electrical property of the material based at least in part on a relative change between the input voltage and a reference voltage at the resistor, and generating, with the sensor, an output signal responsive to the identified change in the at least one electrical property.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of the disclosure.

What is claimed is:

1. An apparatus, comprising:
a tamper-resistant material within an integrated circuit comprising a memory device, the tamper-resistant material coupled to a supply voltage for the integrated circuit and configured to exhibit a change in at least one electrical property responsive to oxidation of the tamper-resistant material, exposure to electromagnetic radiation, or both;
a sensor within the integrated circuit configured to identify the change in the at least one electrical property of the tamper-resistant material and to generate an output signal indicative of a reverse engineering attempt of the integrated circuit responsive to the change in the at least one electrical property of the tamper-resistant material material; and a control system in operable communication with the sensor, the control system configured to receive the output signal to send a signal from the control system to another component of the integrated circuit to instruct the another component of the integrated circuit to at least one of: perform one or more erase operations to erase data stored in the memory device; corrupt the data stored in the memory device of the integrated circuit; and sabotage one or more components of the integrated circuit.

2. The apparatus of claim 1, wherein the tamper-resistant material is coupled to a first node configured to receive the supply voltage and to a second node configured to receive an input voltage, the input voltage comprising a voltage drop of the supply voltage across the tamper-resistant material, wherein the sensor is configured to identify the change in the at least one electrical property of the tamper-resistant material based at least in part on a comparison of the input voltage to a reference voltage.

3. The apparatus of claim 1, wherein the tamper-resistant material is configured to exhibit a change in resistance responsive to oxidation of the tamper-resistant material.

4. The apparatus of claim 1, wherein the tamper-resistant material comprises a metal.

5. The apparatus of claim 1, wherein the tamper-resistant material comprises titanium.

6. The apparatus of claim 1, wherein the tamper-resistant material is configured to exhibit an increased electrical resistance responsive to oxidation of the tamper-resistant material.

7. The apparatus of claim 1, further comprising another tamper-resistant material coupled to the supply voltage and configured to exhibit a change in the at least one electrical property responsive to the other of exposure to electromagnetic radiation or oxidation of the another tamper-resistant material.

8. The apparatus of claim 7, wherein:
the another tamper-resistant material and the tamper-resistant material share an interface; and
the tamper-resistant material is coupled to a first node configured to receive the supply voltage and the another tamper-resistant material is coupled to a second node configured to receive an input voltage, wherein the sensor is configured to identify the change in the at least one electrical property of the tamper-resistant material based at least in part on a comparison of the input voltage to a reference voltage.

9. The apparatus of claim 7, wherein the other tamper-resistant material and the tamper-resistant material are physically separated from one another, and each of the tamper-resistant material and the other tamper-resistant material are coupled to a node configured to receive the supply voltage and coupled to a node for receiving an input voltage.

10. The apparatus of claim 1, wherein the control system comprises a logic configured to corrupt the data stored in the memory device responsive to the output signal of the sensor.

11. The apparatus of claim 1, further comprising at least one material formulated and configured to destroy at least a portion of the integrated circuit responsive to the output signal of the sensor.

12. The apparatus of claim 11, wherein the at least one material comprises at least one etchant formulated and configured to remove at least a portion of at least one metal of a metal line.

13. The apparatus of claim 1, further comprising a comparator configured to invert the output signal responsive to the change in the at least one electrical property.

14. The apparatus of claim 1, wherein the sensor comprises a differential amplifier, the output signal comprising a difference between an input voltage at a first node and a reference voltage.

15. The apparatus of claim 1, further comprising a fuse located between a node configured to receive a supply voltage and the tamper-resistant material.

16. An apparatus, comprising:
a resistor within an integrated circuit and coupled between a first node configured to receive a supply voltage and a second node, the resistor comprising a material formulated and configured to exhibit a change in at least one electrical property responsive to exposure to oxygen, exposure to electromagnetic radiation, or both;
a third node; and
a sensor within the integrated circuit and configured to compare a reference voltage at the third node and an input voltage at the second node.

17. The apparatus of claim 16, further comprising a comparator configured to generate an output signal indicative of the change in the at least one electrical property responsive to the input voltage crossing the reference voltage.

18. The apparatus of claim 16, wherein the material comprises an elemental metal.

19. The apparatus of claim 16, wherein the resistor comprises:
a first material formulated and configured to exhibit a change in resistance responsive to oxidation; and
a second material formulated and configured to exhibit a change in resistance responsive to exposure to electromagnetic radiation.

20. The apparatus of claim 19, wherein the first material and the second material share at least one interface.

21. The apparatus of claim 16, wherein the resistor comprises a material formulated and configured to exhibit the change in the at least one electrical property responsive to oxidation, and further comprising another resistor coupled between the third node and a fourth node, the another resistor comprising another material formulated and configured to exhibit the change in the at least one electrical property responsive to exposure to electromagnetic radiation.

22. The apparatus of claim 1, wherein the tamper-resistant material is located on a power up block of the integrated circuit.

23. The apparatus of claim 22, wherein the tamper-resistant material is configured to prevent a power up signal from being provided by the power up block responsive to the change in the at least one electrical property.

24. The apparatus of claim 1, wherein the tamper-resistant material comprises copper, aluminum, nickel, magnesium, chromium, iron, cobalt, zinc, zirconium, ruthenium, silver, hafnium, tantalum, tungsten, iridium, gold, niobium, silicon, germanium, or combinations thereof.

25. The apparatus of claim 1, wherein the tamper-resistant material comprises ammonium dichromate, one or more silver halides, or a photoconductive polymer.

26. An apparatus, comprising:

a tamper-resistant material within an integrated circuit, the tamper-resistant material configured to identify a reverse engineering attempt of the integrated circuit, the tamper-resistant material coupled to a supply voltage for the integrated circuit and configured to exhibit a change in at least one electrical property responsive to oxidation of the tamper-resistant material, exposure to electromagnetic radiation, or both; and a sensor within the integrated circuit configured to identify the change in the at least one electrical property of the tamper-resistant material and to generate an output signal responsive to the change in the at least one electrical property of the tamper-resistant material; and a fuse between a node configured to receive the supply voltage and the tamper-resistant material.

27. The apparatus of claim 26, wherein the fuse is configured to enable the sensor responsive to application of a threshold voltage to the fuse.

\* \* \* \* \*

UNITED STATES PATENT AND TRADEMARK OFFICE
CERTIFICATE OF CORRECTION

PATENT NO. : 11,139,256 B2
APPLICATION NO. : 16/547289
DATED : October 5, 2021
INVENTOR(S) : Diana C. Majerus, Scott D. Van De Graaff and Matthew N. Rocklein Page 1 of 1

It is certified that error appears in the above-identified patent and that said Letters Patent is hereby corrected as shown below:

In the Specification
        Column 6, Line 22, change "(CBRAIVI)" to --(CBRAM)--

In the Claims
    Claim 1, Column 19, Line 3, change "material material;" to --material;--

Signed and Sealed this
Seventh Day of December, 2021

Drew Hirshfeld
*Performing the Functions and Duties of the
Under Secretary of Commerce for Intellectual Property and
Director of the United States Patent and Trademark Office*